United States Patent [19]

Sawatari

[11] 4,017,188
[45] Apr. 12, 1977

[54] SURFACE PROFILE MEASURING DEVICE AND METHOD

[75] Inventor: Takeo Sawatari, Southfield, Mich.

[73] Assignee: The Bendix Corporation, Southfield, Mich.

[22] Filed: Feb. 26, 1975

[21] Appl. No.: 553,332

[52] U.S. Cl. .............................. 356/120; 356/209; 356/212

[51] Int. Cl.² ........................................ G01B 11/30

[58] Field of Search .......... 356/167, 237, 209–212, 356/120

[56] References Cited

UNITED STATES PATENTS

| | | | |
|---|---|---|---|
| 3,536,405 | 10/1970 | Flower | 356/212 |
| 3,606,541 | 9/1971 | Sugano et al. | 356/120 |
| 3,663,107 | 5/1972 | Denis et al. | 356/120 |
| 3,700,903 | 10/1972 | Adler et al. | 356/120 |
| 3,715,165 | 2/1973 | Smith | 356/209 |
| 3,719,421 | 3/1973 | Poilleux et al. | 356/120 |
| 3,804,521 | 4/1974 | Sprague | 356/210 |

FOREIGN PATENTS OR APPLICATIONS 916,229  8/1954  Germany .......................... 356/209

Primary Examiner—John K. Corbin
Assistant Examiner—R. A. Rosenberger
Attorney, Agent, or Firm—John R. Benefiel; Kenneth A. Seaman

[57] ABSTRACT

An arrangement for measuring the profile of surfaces having a characteristic one-directional lay with sufficient resolution to determine the surface roughness thereof is disclosed, comprising a device for illuminating a small spot on the surface, with an image of the spot projected through an objective lens onto a large area light detector positioned to generate a signal corresponding to the total illumination produced by the image. The device also includes a second light detector which views a second image of the spot focused by the objective lens through a slit disposed perpendicularly to the direction of the surface lay. The respective detector signals are divided to produce signals corresponding to the ratio thereof, which, according to the present invention, correspond to the variations of the surface height occuring as the illuminated spot is scanned across the surface. A graphical profile of the surface may be obtained by recording these signals as a function of the scanned distance.

4 Claims, 2 Drawing Figures

SURFACE PROFILE MEASURING DEVICE AND METHOD

BACKGROUND OF THE INVENTION

1. Field of the Invention

This invention concerns surface profile measuring devices, and more particularly such devices which are suited to measuring surface roughness.

2. Description of the Prior Art

Measurement of surface roughness by noncontacting means has long been attempted by various optical methods involving light scattering, interferometers, lasers, etc. Problems of inadequate accuracy, undue complexity and incompatibility with current roughness standards (in that a direct profile readout typical of mechanical devices is not produced) have been encountered with many of these approaches. Examples of prior art approaches of this type are found in the following U.S. Pat. Nos: 2,315,282; 2,604,809; 2,693,735; 2,732,760; 2,755,702; 2,803,161; 3,019,347; 3,222,978; 3,286,582; 3,395,608; 3,509,349; 3,676,006; 3,794,427; and 3,796,495.

It is an object of the present invention to provide such an optical surface roughness measuring device for surfaces having a characteristic one directional surface lay which is relatively simple and produces a profile of the surface condition so as to be compatible with current surface roughness standards.

SUMMARY OF THE INVENTION

This and other objects which will become apparent upon a reading of the following specification and claims is accomplished by a device for illuminating a small spot on the surface, with an image of the spot projected through an objective lens onto a large area light detector positioned to generate a signal corresponding to the total illumination produced by the image. The device also includes a second light detector which views a second image of the spot focused by the objective lens through a slit disposed perpendicularly to the direction of the surface lay. The respective detector signals are divided to produce signals corresponding to the ratio thereof, which, according to the present invention, correspond to the variations of the surface height occurring as the illuminated spot is scanned across the surface. A graphical profile of the surface may be obtained by recording these signals as a function of the scanned distance.

DETAILED DESCRIPTION

Figures 1, 2:
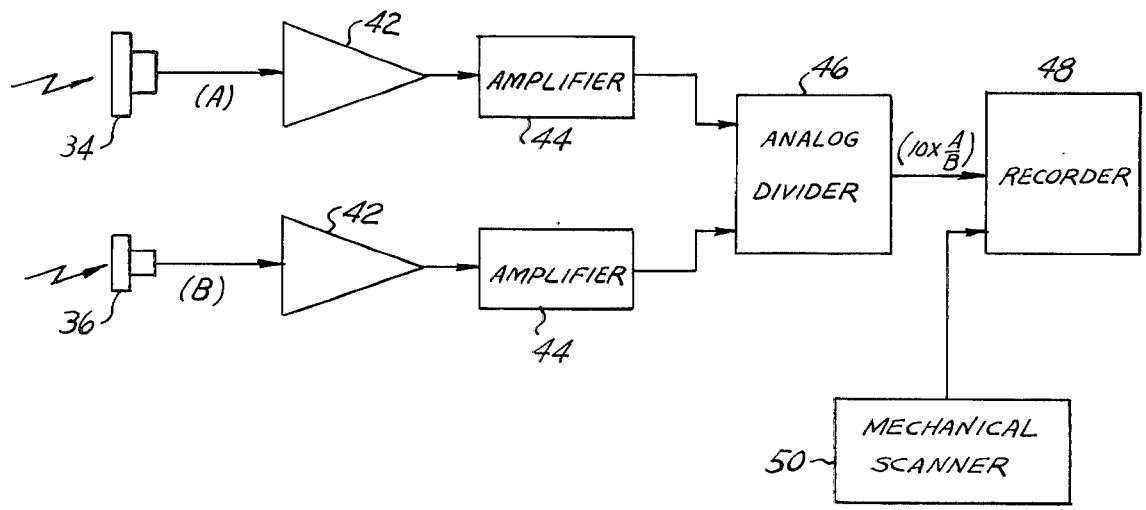
FIG. 1 is a diagrammatic representation of an optical profile measuring arrangement according to the present invention.
FIG. 2 is a block diagram representation of the signal processing circuitry associated with the system depicted in FIG. 1.

The arrangement according to the present invention is based on a known method of optically measuring distances from a reference plane to a reflective surface, this approach being commonly known as Simon's method.

This method involves focusing an image of an illuminated spot on the surface to be examined by an objective lens and optically positioning a pair of pinholes on either side of the plane of the focused image when the surface is at some reference distance away. A pair of light detectors are positioned so as to generate electrical signals corresponding to the amount of light passing through each pinhole. These signals vary with distance variations due to increasing and decreasing out-of-focus conditions created by relative positioning of the surface either closer or further away from the reference position. By electrically processing the signals so as to arrive at a signal equal to the ratio of the sum and difference of these signals, a signal corresponding to the variation of the surface from the reference distance was generated which had a comparatively great linear dynamic range by virtue of mutually compensating nonlinearity in the two signals.

When using this method with relatively rough surfaces such as machined metal surfaces, a gross error is caused by distortion of the spot image due to surface tilt on a micro scale, thereby affecting the amount of illumination received by the two light detectors in a way to distort the relationship between distance and illumination.

According to the present invention, this arrangement is modified to greatly reduce this error, and indeed particularly adapt this concept to measurement of the profile of such rough surfaces which has a characteristic one-directional lay, i.e., those surfaces in which the peaks and valleys occur along a single direction.

Referring to FIG. 1, the arrangement according to the present invention is depicted in diagrammatic form. This arrangement 10 provides a means for illuminating a spot 12 on the surface 14, such means including a microscope illuminator 16 with diffuser 18, and condenser lens 20 converging the resulting light beam on a 10 mil pinhole 22. The beam then diverges to a first beam splitter 24 which reflects the diverging beam to a microscope objective lens 26 which focuses the beam onto the surface 14.

The beam is reflected back from the surface to the microscope objective lens 26 which projects an image of the illuminated spot through the first beam splitter 24 and second beam splitter 30 onto a large area light detector 34. The large area light detector 34 is adapted and positioned to generate electrical signals corresponding to the total illumination produced by the image of the illuminated spot 12 projected thereon. It has been found that a relatively high power microscope objective lens 26 (i.e., 21X and greater) is required to minimize the displacement of the reflected beam from the pupil plane of the microscope objective lens 26 to thereby minimize spot image distortion and resulting errors.

The second beam splitter 30 reflects a portion of the reflected beam to a slit light detector 36 located forward of the focal plane 38 which detects the illumination passing through a slit 40 (5 mm × 0.150 mm) and generates a corresponding signal.

The use of the slit 40 rather than a pinhole in the method of Simon obviates the difficulty caused by displacement of the beam by micro surface tilt while still producing a signal corresponding to the relative surface distance variations. On the other hand, this is so only in surface conditions in which the peaks and valleys occur along a single direction, and the present invention is adapted to profiling for these surfaces only. Also, the surface 14 must be aligned with the system 10 so as to be scanned along a direction normal to this lay.

Referring to FIG. 2, it can be seen that the light detector signals are combined in a different manner than in Simon's method. These signals are amplified by preamps 42 and amplifiers 44, with an output signal generated therefrom corresponding to the ratio A/B (where A is the large area light detector 34 signal and B is the slit-shielded light detector 36 signal) by means of an analog divider 46.

This signal would in practice be displayed by display means such as being plotted on a recorder 48 against the scanned position information being received from the scanner device 50 which would be utilized to relatively move the surface 14 and the arrangement 10.

Thus, a profile plot of the surface would be generated in a similar manner with current mechanical profile scanning methods.

It should be noted that the slit 40 and slit light detector 36 are located forwardly of the focal plane as shown in FIG. 1 so as to generate signals which are continuously proportional to surface height variations. In addition, the precise location of the slit light detector 36 should be adjusted to maximize the linear dynamic range of the generated signals. For a focal distance of 27 cm from the microscope objective lens 26 this distance has been found to be approximately 7 cm forward of the focal plane 38.

While the dynamic range of Simon's method has been reduced by this arrangement, gross errors have been minimized due both to the distortion error described above, and also due to the differing magnifications existing at the two pinholes, and the linear dynamic range is adequate for surface roughness variations if the specimen is kept flat with respect to the system 10.

What is claim is:

1. An optical surface profiling device for generating signals corresponding to variations in a surface comprising:
   means for illuminating a spot scanned across said surface;
   objective lens means for projecting an image of said illuminated spot;
   large area detector means located to receive said projected image and generating a signal corresponding to the total illumination produced by the spot image projected thereon;
   slit detector means located forwardly of said focal plane and including a light detector and further including a slit interposed between said objective lens means and said light detector, said means generating signals corresponding to the illumination produced by an image of said spot passing through said slit;
   means for generating signals from said large area detector means signals and said slit detector means signals corresponding to the ratio of said signals;
   display means displaying said signals as a function of the scan position of said illuminated spot;
   whereby signals corresponding to the distance to said surface from a fixed reference are generated.

2. An optical surface profiling device for generating signals corresponding to variations in a surface comprising:
   means for illuminating a spot scanned across said surface;
   objective lens means for projecting an image of said illuminated spot;
   first detector means located to receive said projected image and generating a signal corresponding to the total illumination produced by the spot image projected thereon;
   second detector means comprising a detector and a filter having a slit, said detector receiving the projected image of said spot passing through the slit and generating a signal corresponding to the illumination passing through the slit;
   means for generating signals from said first detector means signals and said second detector means signals corresponding to the ratio of said signals;
   display means displaying said signals as a function of the scan position of said illuminated spot;
   whereby signals corresponding to the distance to said surface from a fixed reference are generated.

3. An optical profiling device of the type described in claim 2 wherein said surface has a characteristic one-direction surface lay and the slit is disposed perpendicular to the characteristic one-dimension surface lay.

4. A method of optically profiling a surface with a source of light to generate signals corresponding to variations in the surface, the steps of said method comprising:
   scanning an illuminated spot across the surface;
   projecting an image of the illuminated spot with an objective lens;
   splitting the image of the illuminated spot into first and second images;
   generating a first signal corresponding to the total illumination of the first image;
   generating a second signal corresponding to the illumination of the second image passing through a slit filter;
   generating a third signal corresponding to the ratio of said first and second signals; and
   displaying said third signal as a function of the scanning of the illuminated spot across the surface as an indication of variations in the surface.

* * * * *